United States Patent [19]

Whiteford

[11] 4,136,671

[45] Jan. 30, 1979

[54] ELECTROMAGNETIC RADIATION REFLECTOR

[76] Inventor: Carl L. Whiteford, 3 High Point Rd., Westport, Conn. 06902

[21] Appl. No.: 780,807

[22] Filed: Mar. 24, 1977

[51] Int. Cl.² .............................................. F24J 3/02
[52] U.S. Cl. ...................................... 126/271; 350/295
[58] Field of Search ........................ 350/293, 295, 320; 126/270, 271; 237/1 A

[56] References Cited

U.S. PATENT DOCUMENTS

| | | | |
|---|---|---|---|
| 2,141,330 | 12/1938 | Abbot | 126/271 |
| 3,893,755 | 7/1975 | Cobarg et al. | 350/295 |
| 3,915,147 | 10/1975 | Rineer | 126/271 |
| 3,964,464 | 6/1976 | Hockman | 126/270 |
| 3,972,600 | 8/1976 | Cobarg | 350/295 |
| 4,011,855 | 3/1977 | Eshelman | 126/271 |
| 4,033,676 | 7/1977 | Brantley, Jr. et al. | 350/295 |
| 4,038,971 | 8/1977 | Bezborodko | 126/271 |
| 4,038,972 | 8/1977 | Orrison | 126/271 |

Primary Examiner—Kenneth W. Sprague
Attorney, Agent, or Firm—Pennie & Edmonds

[57] ABSTRACT

A cylindrical arc reflector of electromagnetic radiation which is a rectangular sheet of material having a radiation reflective surface composed of longitudinal segments that reflect substantially all of the impingent radiation to a longitudinal focal line when the reflective surface is held in the form of a concave cylindrical arc by a pressure differential. The sheet is mounted by its longitudinal edges with its transverse edges movably sealed so as to form an enclosure into which a low vacuum is introduced to create the form holding pressure differential. The reflector is particularly adaptable for use in a solar energy collection apparatus that is constructed using a support structure that does not include the precisely accurate shape of the reflective surface.

30 Claims, 6 Drawing Figures

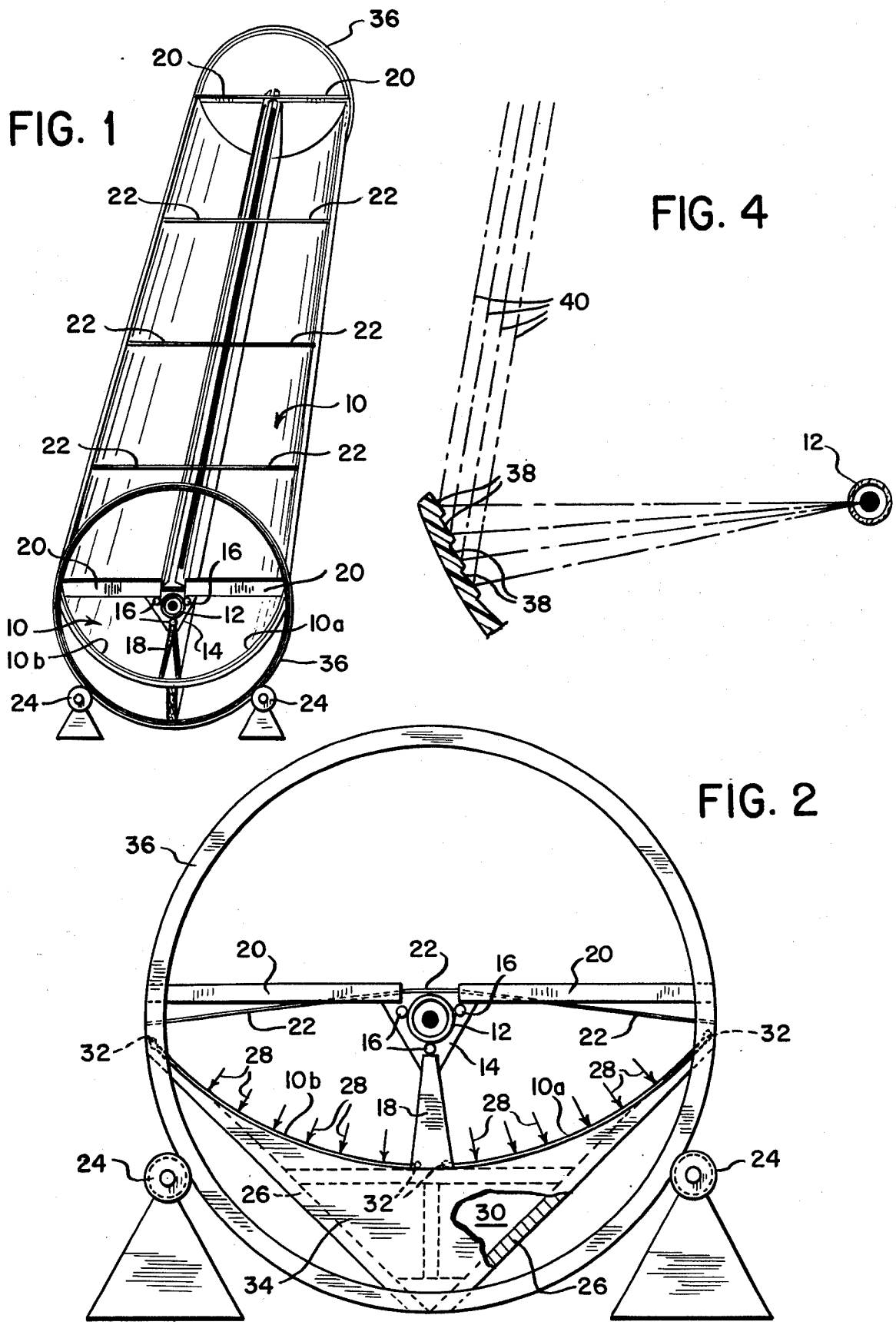

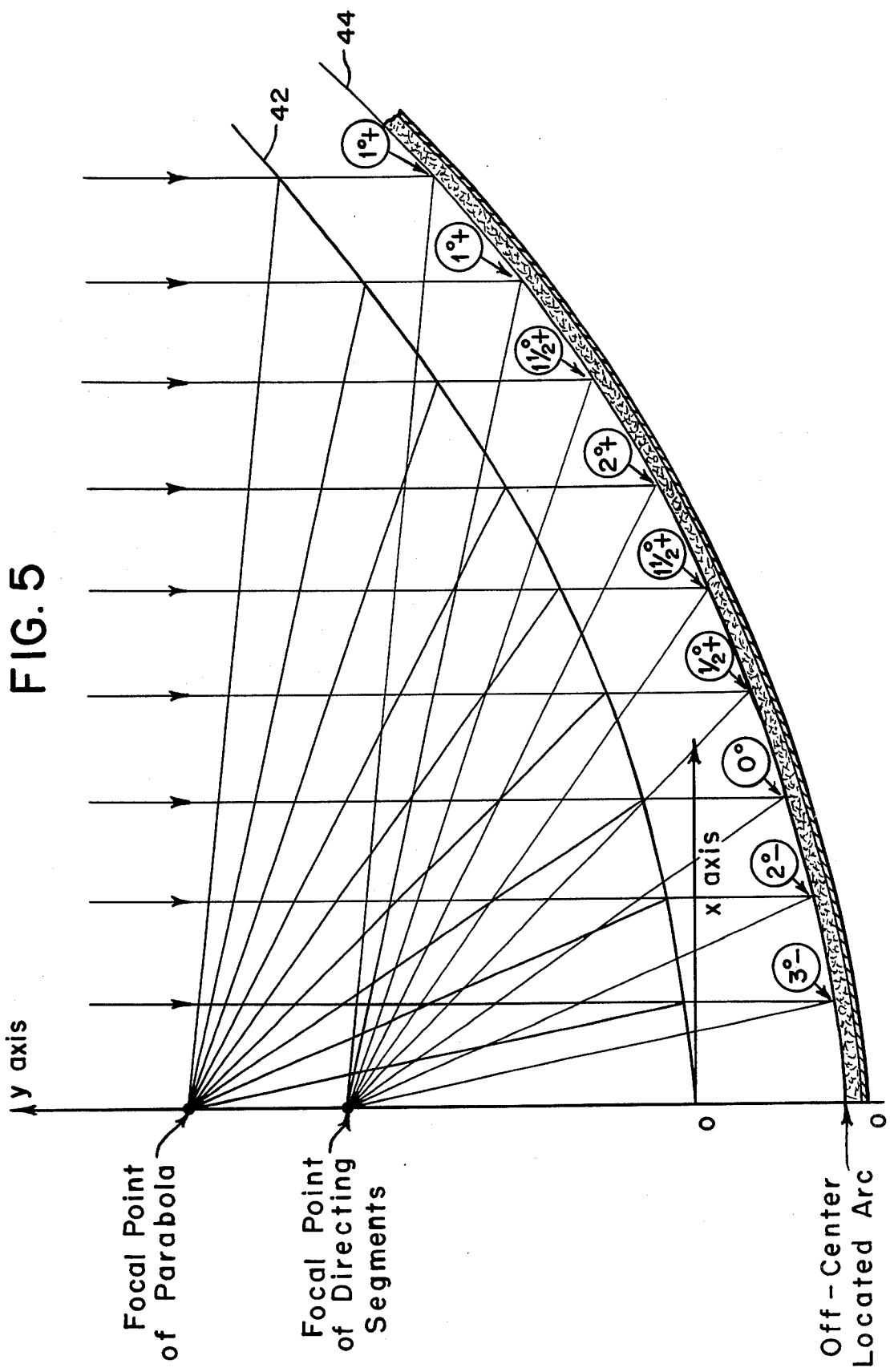

ELECTROMAGNETIC RADIATION REFLECTOR

BACKGROUND OF THE INVENTION

This invention relates generally to reflectors of electromagnetic radiation which comprise a plurality of reflecting elements that function as a single reflector. The relflector of the invention is particularly adaptable to the collection of solar energy for use in heating systems and the like.

Many types of electromagnetic radiation reflectors for use as antennas, in searchlights and for concentration of solar energy are known. Generally these prior art reflectors are based on spherical, parabolic or hyperbolic arcs to take advantage of the known focal properties of these shapes. For example, U.S. Pat. Nos. 2,907,318 to A. E. Awot dated Oct. 6, 1959 and 3,951,128 to J. L. Schoenfelder dated Apr. 20, 1976 utilize parabolic focal properties in solar energy collection devices. Additionally, planar or so-called flat plate collectors have also been used for such purposes.

The known electromagnetic radiation reflectors using spherical, parabolic or hyperbolic arcs require a means for ensuring that the desired arc be accurately maintained with the attendant disadvantage that they must be constructed of heavy expensive materials having sufficient strength and rigidity to meet this requirement. In contrast the reflector of the present invention is constructed of lightweight, flexible, plastic or foil sheets and a simple supporting frame and yet retains the advantageous focal properties of prior art reflectors. The simplicity of construction achieved by the present invention is extremely advantageous in solar energy collection applications because the efficiencies of focal point collectors are realized without the economic disadvantages of those prior art collectors.

BRIEF SUMMARY OF THE INVENTION

The invention is a reflector of electromagnetic radiation comprising a gas impermeable sheet of flexible material having a radiation reflective surface and an opposite surface, one of which surfaces is sealed in a substantially gas-tight enclosure. The sheet of flexible material is held in a substantially cylindrical arc, with its reflective surface concave, by maintaining a pressure differential between the two surfaces of the sheet. The reflective surface is a plurality of segments that are at angles with respect to the true cylindrical arc of the sheet. These angles are chosen so that substantially all of the radiation striking the surface of the sheet is reflected toward a predetermined focus thereby causing the cylindrical arc shape of the sheet to function as a parabolic reflector. The structure of the reflector of the invention may be made exceedingly simple because the only requirement is to seal the edges of the sheet so that a substantially uniform pressure differential between the surfaces of the sheet can be maintained in a preferred arrangement. Two edges of the sheet are secured at predetermined fixed distances apart and the remaining two edges are movably sealed so that the sheet is in the nature of a loose diaphragm that conforms to a substantially cylindrical arc between the supports when a uniform pressure differential is maintained between the surfaces.

In accordance with the preferred embodiment a solar energy reflector is made using two identical rectangular sheets to focus solar energy on a cylindrical collector located at the longitudinal focal line of the reflector. The sheets are held in a substantially cylindrical arc by maintaining a partial vacuum in a substantially gas-tight enclosure that seals the non-reflecting surface from the reflecting surface. The entire apparatus is rotatable about a longitudinal axis that can be adapted to automatic tracking of the traverse of the sun and also be completely inverted at night or during adverse weather conditions such as rain, snow, hail, etc.

In an alternative embodiment the reflective surface is sealed from the non-reflective surface in an enclosure having a transparent wall of suitable plastic or glass opposite the reflective surface. The sheet is held in a cylindrical arc by a pressure in the enclosure higher than atmosphere pressure to which the surface opposite the reflective surface is exposed.

BRIEF DESCRIPTION OF THE DRAWINGS

The invention will be more fully described in connection with the annexed drawings, in which:

FIG. 1 is a perspective view of a solar energy collector utilizing the radiation reflector of the invention;

FIG. 2 is a partially cutaway end view of the solar energy collector of FIG. 1;

FIG. 4 is a magnified view of the reflective surface of the reflector of the invention illustrating the angled segments on that surface;

FIG. 5 illustrates a graphical method for determining the angle of the angled segments of the reflective surface.

DETAILED DESCRIPTION OF THE PREFERRED EMBODIMENT

Figure 3:
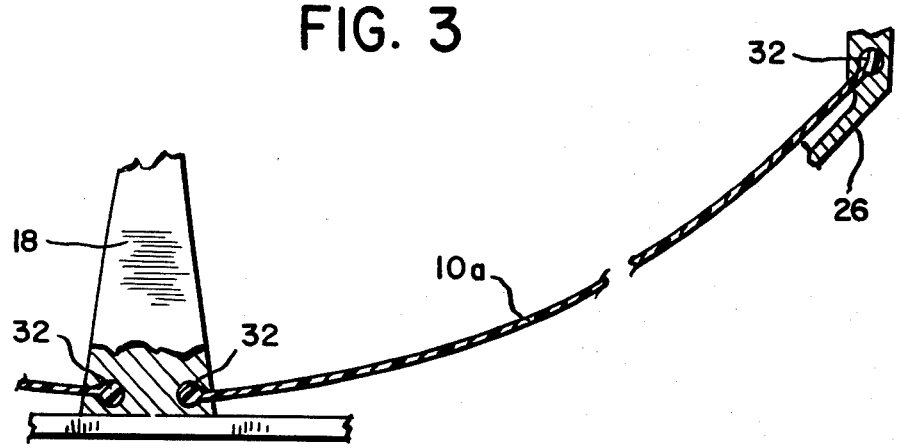
FIG. 3 is an exploded view of the method for securing the reflector of the invention to the support structure.

FIG. 1 shows a perspective view of a solar energy collection apparatus incorporating the radiation reflector 10 of the invention. Typical overall dimensions for such an apparatus are about eight (8) feet long about four (4) feet in width. A cylindrical collector tube 12 is disposed in the longitudinal plane of the reflector and held with its longitudinal axis at the focal line of the reflector by rollers 16 of mounting bracket 14. Mounting bracket 14 is fixed in the vertical position by base 18 and in the transverse position by members 20 and guy wires 22. This arrangement permits rotation of the entire structure of reflector 10 about the collector tube 12, thus permitting the connection of piping (not shown) to collector 12, for a suitable heat transfer fluid, without the use of complex and expensive rotating seals. Rotation of the reflector structure may be accomplished by driving one or more of support rollers 24 with a suitable engine or motor which in turn may rotate the reflector and its support structure through friction or meshed gears. Such a system can be easily adapted to turn the reflector in synchronism with the traverse of the sun from east to west for maximum exposure, particularly when the longitudinal axis is in a generally north-south orientation.

Referring now to FIG. 2, there is shown an end view of the apparatus depicted in FIG. 1. This view has been partially cutaway to better illustrate some of the important structural advantages that are realized when the reflector of the invention is utilized in a solar energy collection apparatus. The reflector comprises two flexible rectangular reflector sheets 10a and 10b which are held in a substantially cylindrical arc by a pressure differential between its surfaces represented by the arrows 28. This pressure differential is caused by creating a partial vacuum in chamber 30 which is a substantially gas-tight enclosure of the surface of the rectangular reflector sheets 10a and 10b opposite the radiation reflective surfaces thereof. As can be seen, the support structure is extremely simple and does not require an accurately formed rigid surface that conforms to the curvature of the reflectors 10a and 10b. The longitudinal edges of the sheets 10a and 10b are secured and sealed as is shown in FIG. 3. The edges of the sheet are formed into beads 32 that are fitted into respective grooves in base 18 and in the end of the tangentially angled member 26 of the support structure. This arrangement permits easy assembly and replacement of reflector sheets 10a and 10b by sliding the beads through the grooves from one end of the support structure to the other. The transverse edges of the sheets are movably sealed against end plates 34 with "O" rings so that the entire enclosure formed by end plates 34, members 26 and reflector sheets 10a and 10b is substantially gas tight. The "O" ring seals permitting sufficient movement of the sheets so that they conform to the desired cylindrical arc when a pressure differential is applied and maintained. Circular members 36 located at either end of the support structure are supported on rollers 24 so that the entire support structure can be rotated about the collector tube as described hereinabove. Thus in adverse weather or when the collection apparatus is inoperative, as for example at night, the entire support structure may be inverted to protect the radiation reflective surfaces of the reflector sheets.

Referring now to FIG. 4, there is shown a magnified transverse section of a portion of the rectangular reflector sheet 10 of the invention, which illustrates the operation of the radiation directing segments 38 of the reflective surface. Parallel rays of electromagnetic radiation, sunlight for example, impinge upon the reflective surface of the sheet, which is held in a substantially cylindrical arc in the above-described manner, and are reflected toward a single longitudinal focal line coordinate with the axis of collector 12. Each segment 38 is constructed at an angle to the cylindrical arc of the sheet so that although the reflector is physically substantially cylindrical in shape, the reflective surface is effectively parabolic. One method of determining the angles of the radiation directing segments is illustrated in FIG. 5 which shows a geometric construction for reflector sheet 10a. Initially a precise parabolic curve is drawn to a scale appropriate for the desired dimensions of the reflector to be constructed. Next a cylindrical arc 44 is found by a series of trials that most nearly approximates the arc of the precise parabola. For the apparatus shown in FIG. 1 a parabola having a focal length of five (5) inches was drawn on the basis of a scale of 1 to 3 for the apparatus having a dimension of about four (4) feet in width. An arc of radius 15½ inches with its center displaced (x axis) 2¼ inches to the left of the origin (0) at a height (y axis) of 13 ¾ inches was chosen as a good approximation. A series of parallel rays are then drawn, and reflected back to the focal point of the parabola. Continuations of these rays are drawn to the cylindrical arc and reflected back to a focal point at a height of five (5) inches which is the focal point of the directing segments. The angle of each directing segment is the difference between the angle of incidence to the precise parabola and the angle of incidence to the arc. The choice of the number of segments is governed by the practical considerations of impressing them on the surface of the reflector sheet. In this example one segment every 1/78 inch having an angle determined by the deviation at its center point was used. It is advantageous to make the segments very slightly transversely arcuate to minimize shadowing. In the example, an arc of about 3°–4° provides a shadow loss radius of 0.014 inches.

A preferred material for the reflector sheet 10 is a dimensionally stable plastic such as for example polycarbonate, fiberglass reinforced polypropylene or carbon fiber reinforced polypropylene. When such plastic materials are used, the directing segments are formed on the surface of the sheet by extrusion plus post-embossing a polished finish to the segments and then given a mirror finish by electrodeposition of aluminum to produce a solar radiation reflective surface. The extruded and finished sheets have an average thickness of about 0.025 inches which ensures sufficient flexibility for a pressure differential of up to about 2 p.s.i. to hold them in the desired cylindrical arc. Such a pressure differential is achieved by creating a vacuum of up to about two pounds in enclosure 30 which can be simply accomplished using a small household type vacuum cleaner.

Figure 6:
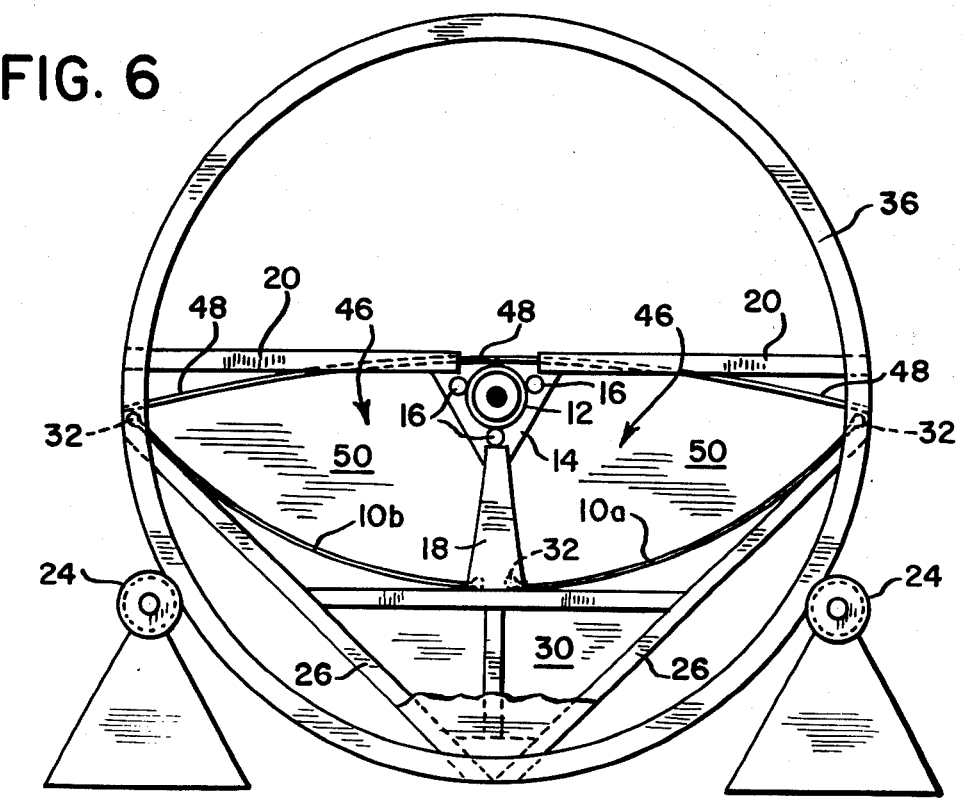
FIG. 6 illustrates an alternative embodiment in end view.

An alternative embodiment of the invention is shown in FIG. 6 wherein a gas-tight enclosure 46 is formed by transparent cover 48, end plate 50 and reflector sheets 10a and 10b. The edges of the sheets are secured and sealed in the manner described for the preferred embodiment and the pressure differential is achieved by creating a pressure higher than atmospheric in enclosure 46 and venting enclosure 30 to the atmosphere.

The foregoing preferred and alternate embodiments are presented by way of example and are not intended to limit my invention as defined in the appended claims.

I claim:

1. A reflector of electromagnetic radiation which comprises:
    (a) at least one rectangular sheet of flexbile material having a radiation reflective surface;
    (b) support means securing two opposite edges of said sheet a predetermined distance apart and means movably sealing the remaining two opposite edges of said sheet;
    (c) said support means including means for substantially gas-tight enclosure of one surface of said sheet;
    (d) means applying and maintaining a substantially uniform pressure differential between the surfaces of said sheet for holding said sheet in a substantially cylindrical arc;
    (e) said reflective surface being on the concave surface and having a plurality of longitudinal segments angled with respect to said arc for directing substantially all of the parallel rays of electromagnetic radiation striking said surface toward the same longitudinal focal line whereby said reflective surface is effectively a parabola.

2. The reflector of claim 1, wherein said means applying a pressure differential is a means for creating a partial vacuum in a substantially gas-tight enclosure of the surface opposite said reflective surface.

3. The reflector of claim 2, wherein said vaccum is up to about two pounds.

4. The reflector of claim 1, wherein said means applying a pressure differential is a means for creating a pressure above atmospheric pressure in a substantially gas tight enclosure of said reflective surface.

5. The reflector of claim 1, wherein said means for securing two opposite edges of said sheet comprises a matching bead and groove whereby said sheet may be slidably secured.

6. The reflector of claim 1, wherein said material is a polycarbonate.

7. The reflector of claim 6, wherein said longitudinal segments are made by extruding said material.

8. The reflector of claim 1, wherein said material is reinforced polypropylene.

9. The reflector of claim 8, wherein said polypropylene is reinforced with fiberglass.

10. The reflector of claim 9, wherein said longitudinal segments are made by extruding said material.

11. The reflector of claim 8, wherein said polypropylene is reinforced with carbon fiber.

12. The reflector of claim 11, wherein said longitudinal segments are made by extruding said material.

13. The reflector of claim 1, wherein said longitudinal segments are transversely arcuate.

14. The reflector of claim 1, further comprising a collector means in the form of a cylinder, the longitudinal axis of which is said longitudinal focal line, for collecting said electromagnetic radiation.

15. Apparatus for reflecting solar energy which comprises:
(a) at least one rectangular sheet of material having a mirror finished surface;
(b) support means securing two opposite edges of said sheet a predetermined distance apart and means movably sealing the remaining two opposite edges of said sheet;
(c) said support means including means for substantially gas-tight enclosure of one surface of said sheet;
(d) means applying and maintaining a substantially uniform pressure differential between the surfaces of said sheet for holding said sheet in a substantially cylindrical arc;
(e) said mirror finished surface having a plurality of longitudinal segments angled with respect to said arc for directing substantially all of the solar energy striking said surface toward a longitudinal focal line; and
(f) means located at said focal line for collecting said solar energy.

16. The reflector of claim 15, wherein said means applying a pressure differential is a means for creating a partial vacuum in a substantially gas-tight enclosure of the surface opposite said reflective surface.

17. The reflector of claim 16, wherein said vacuum is up to about two pounds.

18. The reflector of claim 15, wherein said means applying a pressure differential is a means for creating a pressure above atmospheric pressure in a substantially gas-tight enclosure of said reflective surface.

19. The reflector of claim 15, wherein said means for securing two opposite edges of said sheet comprises a matching bead and groove whereby said sheet may be slidably secured.

20. The reflector of claim 15, wherein said material is a polycarbonate.

21. The reflector of claim 20, wherein said longitudinal segments are made by extruding said material.

22. The reflector of claim 21, wherein said mirror finished surface is vacuum deposited aluminum.

23. The reflector of claim 15, wherein said material is reinforced polypropylene.

24. The reflector of claim 23, wherein said polypropylene is reinforced with fiberglass.

25. The reflector of claim 24, wherein said longitudinal segments are made by extruding said material.

26. The reflector of claim 25, wherein said mirror finished surface is vacuum deposited aluminum.

27. The reflector of claim 23, wherein said polypropylene is reinforced with carbon fiber.

28. The reflector of claim 27, wherein said longitudinal segments are made by extruding said material.

29. The reflector of claim 28, wherein said mirror finished surface is vacuum deposited aluminum.

30. The reflector of claim 18, wherein said longitudinal segments are transversely arcuate.

* * * * *

UNITED STATES PATENT AND TRADEMARK OFFICE
CERTIFICATE OF CORRECTION

PATENT NO. : 4,136,671
DATED : January 30, 1979
INVENTOR(S) : Carl L. Whiteford

It is certified that error appears in the above-identified patent and that said Letters Patent are hereby corrected as shown below:

Column 4, line 3 change "178" to --1/2--

Signed and Sealed this

Fifth Day of June 1979

[SEAL]

Attest:

RUTH C. MASON
Attesting Officer

DONALD W. BANNER
Commissioner of Patents and Trademarks